(12) United States Patent
Aoki et al.

(10) Patent No.: US 11,548,032 B2
(45) Date of Patent: Jan. 10, 2023

(54) METHOD FOR REMOVING WIRE-FORM OBJECTS, DEVICE FOR REMOVING WIRE-FORM OBJECTS, AND METHOD FOR PROCESSING ELECTRONIC/ELECTRICAL APPARATUS COMPONENT SCRAP

(71) Applicant: JX NIPPON MINING & METALS CORPORATION, Tokyo (JP)

(72) Inventors: Katsushi Aoki, Hitachi (JP); Hidetoshi Sasaoka, Hitachi (JP)

(73) Assignee: JX NIPPON MINING & METALS CORPORATION, Tokyo (JP)

( * ) Notice: Subject to any disclaimer, the term of this patent is extended or adjusted under 35 U.S.C. 154(b) by 0 days.

(21) Appl. No.: 16/966,821

(22) PCT Filed: Jan. 30, 2019

(86) PCT No.: PCT/JP2019/003241
§ 371 (c)(1),
(2) Date: Jul. 31, 2020

(87) PCT Pub. No.: WO2019/151350
PCT Pub. Date: Aug. 8, 2019

(65) Prior Publication Data
US 2021/0039138 A1 Feb. 11, 2021

(30) Foreign Application Priority Data
Jan. 31, 2018 (JP) .............................. JP2018-015525

(51) Int. Cl.
*B07B 1/12* (2006.01)
*B07B 1/36* (2006.01)
*B09B 5/00* (2006.01)

(52) U.S. Cl.
CPC ................. *B07B 1/36* (2013.01); *B07B 1/12* (2013.01); *B09B 5/00* (2013.01)

(58) Field of Classification Search
CPC ................. B07B 1/12; B07B 1/36; B09B 5/00
(Continued)

(56) References Cited

U.S. PATENT DOCUMENTS 324,275 A * 8/1885 Rosier ...................... B07B 1/12
 209/385
2,529,620 A * 11/1950 Marnach .................. A23N 5/00
 460/114

(Continued)

FOREIGN PATENT DOCUMENTS

EP 3 862 102 A1 8/2021
JP 53-99671 U 8/1978
(Continued)

OTHER PUBLICATIONS

International Search Report for PCT/JP2019/003241 (PCT/ISA/210) dated Mar. 26, 2019.
(Continued)

*Primary Examiner* — Joseph C Rodriguez
(74) *Attorney, Agent, or Firm* — Birch, Stewart, Kolasch & Birch, LLP

(57) ABSTRACT

Provided is a method for removing wire-form objects, a device for removing wire-form objects, and a method for processing electronic/electrical apparatus component waste, which can efficiently sort wire-form objects from sorting target objects having various shapes. The method for removing wire-form objects includes: arranging a filter in a vibrating sieve machine, the filter including a plurality of rods extending at distances in a feed direction of a raw material; and placing a raw material containing at least wire-form objects and plate-form objects onto the filter, and vibrating the filter to sieve out the wire-form objects under a sieve.

15 Claims, 9 Drawing Sheets

(58) Field of Classification Search
USPC .......................................................... 209/262
See application file for complete search history.

(56) References Cited

U.S. PATENT DOCUMENTS

| | | | | |
|---|---|---|---|---|
| 3,211,289 | A * | 10/1965 | Brumagin ............... | B07B 13/07 |
| | | | | 209/674 |
| 4,664,790 | A * | 5/1987 | Lundqvist ................. | B07B 1/46 |
| | | | | 209/342 |
| 4,763,794 | A * | 8/1988 | Billington, III .......... | B07B 1/50 |
| | | | | 209/379 |
| 5,117,983 | A * | 6/1992 | Marrs ....................... | B07B 1/12 |
| | | | | 209/393 |
| 6,325,215 | B1 * | 12/2001 | Anthony ................... | B07B 9/00 |
| | | | | 209/21 |
| 8,789,706 | B2 * | 7/2014 | Pandraud ............... | B65G 27/04 |
| | | | | 209/320 |
| 2011/0147501 | A1 * | 6/2011 | Valerio .................... | B03B 9/061 |
| | | | | 241/24.25 |
| 2013/0129887 | A1 * | 5/2013 | Hoppe ..................... | B30B 15/34 |
| | | | | 426/479 |
| 2021/0197229 | A1 * | 7/2021 | Aoki ......................... | B07B 1/36 |

FOREIGN PATENT DOCUMENTS

| | | |
|---|---|---|
| JP | 5-85475 U | 11/1993 |
| JP | 3000020 U | 7/1994 |
| JP | 09-38578 A | 2/1997 |
| JP | 2001-205193 A | 7/2001 |
| JP | 2002-153856 A | 5/2002 |
| JP | 2008-6423 A | 1/2008 |
| JP | 2010-51888 A | 3/2010 |
| JP | 2011-168864 A | 9/2011 |
| JP | 2015-123418 A | 7/2015 |
| JP | 2015-150505 A | 8/2015 |
| KR | 10-1256484 B1 | 4/2013 |
| WO | WO 2015/098232 A1 | 7/2015 |

OTHER PUBLICATIONS

Written Opinion of the International Searching Authority for PCT/JP2019/003241 (PCT/ISA/237) dated Mar. 26, 2019.
International Preliminary Report on Patentability and English translation of the Written Opinion of the International Searching Authority (Forms PCT/IB/338, PCT/IB/373 and PCT/ISA/237), dated Aug. 13, 2020 for Application No. PCT/JP/2019/003241.
Japanese Decision of Refusal for corresponding Japanese Application No. 2019-569192, dated Feb. 8, 2022, with an English translation.
Notification of Reason for Refusal issued in corresponding Korean Patent Application No. 10-2020-7024584 dated Feb. 14, 2022, with English translation.
Extended European Search Report for corresponding European Application No. 19747542.9, dated Sep. 24, 2021.

* cited by examiner (a)

(b)

METHOD FOR REMOVING WIRE-FORM OBJECTS, DEVICE FOR REMOVING WIRE-FORM OBJECTS, AND METHOD FOR PROCESSING ELECTRONIC/ELECTRICAL APPARATUS COMPONENT SCRAP

FIELD OF THE INVENTION

The present invention relates to a method for removing wire-form objects, a device for removing wire-form objects, and a method for processing electronic/electrical apparatus component scrap. More particularly, it relates to a method for removing wire-form objects, a device for removing wire-form objects, and a method for processing electronic/electrical apparatus component waste, which are suitable for recycling of used electronic/electrical apparatuses.

BACKGROUND OF THE INVENTION

There has been known a device for selectively removing particular foreign matters, for example, wire-form objects, from objects to be sorted. For example, Japanese Patent Application Publication No. 2015-150505 A (Patent Literature 1) describes an example of a sorting device for sorting a target sorting object from a mixture of long materials by sorting with a vibrating screen and sorting with an air stream.

Further, from the viewpoint of resource conservation in recent years, recovery of variable metals from electronic/electrical apparatus component scrap such as waste electronic home appliances, PCs and mobile phones has increasingly become popular, and an efficient method for recovering the valuable metals has been studied. For example, Japanese Patent Application Publication No. 2015-123418 A (Patent Literature 2) discloses that electronic/electrical apparatus component scrap containing copper is incinerated and then crushed to a predetermined size or less, and the crushed electronic/electrical apparatus component scrap is processed in a copper blast furnace.

CITATION LIST

Patent Literatures

[Patent Literature 1] Japanese Patent Application Publication No. 2015-150505 A
[Patent Literature 2] Japanese Patent Application Publication No. 2015-123418 A

SUMMARY OF THE INVENTION

However, as illustrated in FIGS. 8(a) and 8(b), Patent Literature 1 only discloses a sorting device for sorting long wire-form and long scattering target objects, and the method disclosed in the literature does not use any sorting target objects containing foreign matters having shapes other than the long wire-form objects, such as plate, pillar and cylindrical shapes, as sorting target objects.

As described in Patent Literature 2, when the incinerated electronic/electrical apparatus component scrap is processed in the blast furnace, the presence of refining inhibitors such as aluminum, antimony, iron and nickel in the electronic/electrical apparatus component scrap may decrease a processing efficiency of the blast furnace for processing the scrap. In order to suppress the introduction of the refining inhibitors into the blast furnace, it is desirable to carry out processing for previously reducing the refining inhibitors in the electronic/electrical apparatus component scrap to be introduced into the blast furnace.

Further, in recent years, separation of single components from the electronic/electrical apparatus component scrap and processing of them have also been considered. However, under the circumstances, it is difficult to selectively separate and recover desired single components from a wide variety of component scrap having various shapes, and various studies have been made.

In particular, the electronic/electrical apparatus component scrap contains linear objects such as covered wires, copper wires, and bird's nests (hereinafter referred to as "wire-form objects" or "wire-form scrap"). The wire-form objects are easily entangled with other components and/or equipment when sorting desired single components from a wide variety of component scrap having various shapes, which may cause deterioration of separation accuracy and equipment troubles. Further, coated portions of the coated wires contain Sb which is the refining inhibitor, and the coated wires may be mixed into the blast furnace to affect the operation of the blast furnace.

In view of the above problems, the present invention provides a method for removing wire-form objects, a device for removing wire-form objects, and a method for processing electronic/electrical apparatus component waste, which can efficiently sort wire-form objects from sorting target objects having various shapes.

As a result of intensive studies in order to solve the above problems, the present inventors have found that the wire-form objects can be efficiently removed from sorting target objects by carrying out sieving using a vibrating sieve machine in combination with a specific filter.

In one aspect, the present invention completed on the basis of the above findings provides a method for removing wire-form objects, the method which includes: arranging a filter in a vibrating sieve machine, the filter including a plurality of rods extending at distances in a feed direction of a raw material; and placing a raw material containing at least wire-form objects and plate-form objects onto the filter, and vibrating the filter to sieve out the wire-form objects under a sieve.

In one embodiment of the method for removing the wire-form objects according to the present invention, a surface of each of the plurality of rods that are brought into contact with the raw material has a curved surface formed for sieving out the wire-form objects under the sieve.

In another embodiment of the method for removing the wire-form objects according to the present invention, the distances between the plurality of rods and diameters of the plurality of rods are adjusted based on sizes of the plate-form objects contained in the raw material.

In still another embodiment of the method for removing the wire-form objects according to the present invention, the distances between the plurality of rods are adjusted such that each of the distances is 1.2 to 6 times a characteristic particle diameter of the wire-form objects, and is narrower than a minimum short diameter of the plate-form objects.

In yet another embodiment, the method for removing the wire-form objects according to the present invention includes performing the sieving while disposing a pressing member for pressing the raw material onto the filter.

In still another embodiment of the method for removing the wire-form objects according to the present invention, the vibrating sieve machine includes a flat plate-shaped table arranged on an upstream side of the filter, and the method further includes dispersing the raw material on an upper surface of the table by vibrating the raw material fed onto the table, and feeding the dispersed raw material from the upper surface of the table to an upper surface of the filter.

In still another embodiment of the method for removing the wire-form objects according to the present invention, the raw material is electronic/electrical apparatus component scrap, the plate-form objects contain substrate scrap, and the wire-form objects contain wire scrap.

In another aspect, the present invention provides a method for processing electronic/electric apparatus component scrap, the method including: arranging a filter in a vibrating sieve machine, the filter including a plurality of rods extending at distances in a feed direction of a raw material; and placing a raw material containing at least wire-form objects and plate-form objects onto the filter, and vibrating the filter to sieve out the wire-form objects under a sieve.

In still another embodiment of the method for processing the electronic/electrical apparatus component scrap according to the present invention, the wire-form scrap includes coated wires.

In another aspect, the present invention provides a device for removing wire-form objects, the device including: a vibrating sieve machine; a filter including a plurality of rods extending at distances in a feed direction of a raw material provided in the vibrating sieve machine; and a vibration applying unit which applies vibration to the filter, wherein a raw material containing at least wire-form objects and plate-form objects is placed onto the filter, and the filter is vibrated to sieve out the wire-form objects under a sieve.

In one embodiment, the device for removing the wire-form objects according to the present invention further including a pressing member that can press the raw material placed on the filter from above.

In another embodiment of the device for removing the wire-form objects according to the present invention, the pressing member has elasticity.

In yet another embodiment of the device for removing the wire-form objects according to the present invention, the pressing member has a fixed end that is fixed to the vibrating sieve machine on a feed side of the raw material, and has a free end that is not fixed to the vibrating sieve machine on a discharge side of the raw material.

In yet another embodiment of the device for removing the wire-form objects according to the present invention, the fixed end is fixed to an upper portion of a feed port for feeding the raw material to an upper surface of the filter, and the pressing member is suspended from the feed side toward the discharge side of the raw material with the fixed end as a starting point, and the free end of the pressing member is movable in an up-down direction while pressing the raw material against the upper surface of the filter on the discharge side of the raw material.

In still another embodiment of the device for removing the wire-form objects according to the present invention, the vibrating sieve machine includes a flat plate-shaped table arranged on an upstream side of the filter, and the raw material fed onto an upper surface of the table is vibrated to disperse the raw material on the upper surface of the table, and the dispersed raw material is fed from the upper surface of the table to the upper surface of the filter.

In still another embodiment of the device for removing the wire-form objects according to the present invention, the raw material is electronic/electrical apparatus component scrap, the plate-form objects contain substrate scrap, and the wire-form objects contain wire scrap.

According to the present invention, it is possible to provide a method for removing wire-form objects, a device for removing wire-form objects, and a method for processing electronic/electrical apparatus component waste, which can efficiently sort wire-form objects from sorting target objects having various shapes.

DETAILED DESCRIPTION OF THE INVENTION

Figure 1:
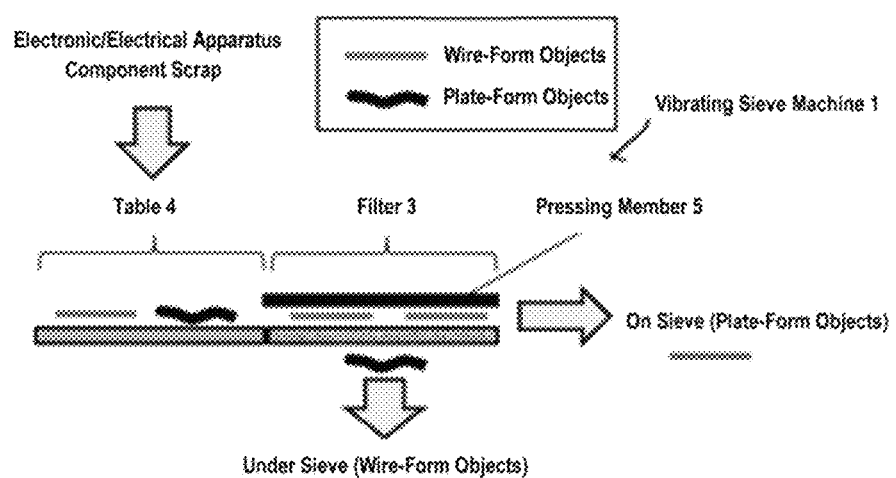
FIG. 1 is a schematic view showing a device for removing wire-form objects according to an embodiment of the present invention.

Hereinafter, embodiments of the present invention will be described. A raw material used in a method for removing wire-form objects according to the embodiment of the present invention is not particularly limited as long as it is a raw material containing at least wire-form objects and plate-form objects. The wire-form objects refer to wire-shaped members each having a short diameter and a long diameter, and may include various wires such as electric wires, cables, and conducting wires, although not particularly limited thereto. The plate-form objects are not particularly limited as long as they are plate-shaped members, and examples of them include substrates, plastic plates, metal plates and the like. Typically, for example, a plate-shaped member having a surface area of 1 cm$^2$ or more and a thickness of 2 mm or more can be suitably used.

The raw material may contain objects each having a three-dimensional shape other than the wire-form and plate-form, for example, a cylindrical shape, a pillar shape, a rectangular shape, an irregular block shape, and the like. In the following descriptions, a case where electronic/electrical apparatus component scrap is used as the raw material will be described as an example. However, as described above, the raw material used in the embodiments of the present invention is not, of course, limited to the electronic/electrical apparatus component scrap.

In the embodiment of the present invention, the "electronic/electrical apparatus component scrap" refers to scrap obtained by crushing electronic/electric apparatuses such as waste home electric appliances, PCs, and mobile phones, recovering them and then crushing them to an appropriate size. In the present invention, the crushing for obtaining the electronic/electrical apparatus component scrap may be performed by an operator. However, crushed objects may be purchased on the market.

The crushing method is carried out by any apparatus that is not limited to a specific apparatus. The apparatus does not include that belonging to the category of a crusher. Further, it is desirable to carry out crushing so that the shape of the component is not impaired as much as possible, and examples of the crushing apparatus include a substrate surface peeling apparatus, a cross flow shredder, and a vertical rotary crushing apparatus. Alternatively, a coarse crushing apparatus such as a parts separator may be used.

In the present embodiment, the electronic/electrical apparatus component scrap is preferably crushed to a maximum diameter of about 100 mm or less, although not limited thereto. Further, it is preferable that the raw material of the electronic/electrical apparatus component scrap according to the present embodiment is coarsely crushed in advance to separate the scrap as single components in the form of capacitors, plastics, substrates, wire scrap, ICs, connectors, metals and the like. This can lead to easy sorting of specific single components by a rotary sorting machine as described later.

The coarsely crushed electronic/electrical apparatus component scrap may be subjected to wind power sorting, and lightweight products sorted in the wind power sorting of 3 m/s to 20 m/s may be used as the processing target of the present embodiment. By combining the wind power sorting, a sorting efficiency can be improved. The wind power sorting may be performed before or after sieving of the wire-form scrap as described below. The separation of noble metal-containing materials such as substrates and ICs from metals is preferably carried out at a wind rate of from 10 m/s to 18 m/s, more preferably from 15 m/s to 18 m/s, although it depends on the materials contained in the electronic/electrical apparatus component scrap. In order to improve the concentration of the condenser and the metal fraction, the optimum wind rate is preferably from 5 m/s to 15 m/s, and more preferably from 8 m/s to 12 m/s. When separating plastics from component scrap containing films, powders, plastics, and the like, which may affect clogging of a filter as described later or an erroneous detection of a sensor 3, the wind rate is preferably from 5 m/s to 8 m/s, and more preferably from 6 m/s to 7 m/s.

In the present embodiment, wire scrap is separated from the raw material, i.e., the electronic/electrical apparatus component scrap herein, as wire-form objects contained in the electronic/electrical apparatus component scrap, by sieving with, for example, a vibrating sieve machine 1 as shown in FIG. 1. The "wire scrap" means inter-device wirings of electronic/electric apparatuses and electric wires used inside the apparatuses, which are made of copper, copper alloys, aluminum and the like. The wire scrap includes long linear scrap called coated wires, copper wires, or bird's nests.

The wire scrap is easily entangled with other components and equipment when sorting the electronic/electric apparatus component scrap, which may cause deterioration of separation accuracy and equipment troubles. Among the wire scrap, the coated wires particularly contain about 0.3% of Sb which is a refining inhibitor, in the coated portion. The mixing of the coated wires into the blast furnace may affect the operation of the blast furnace.

In the present embodiment, when sieving the wire scrap from the electronic/electrical apparatus component scrap using the vibrating sieve machine 1, the coated wires can be separated by sieving to remove Sb, the refining inhibitor, to the outside of the processing system of the blast furnace.

Figure 2:
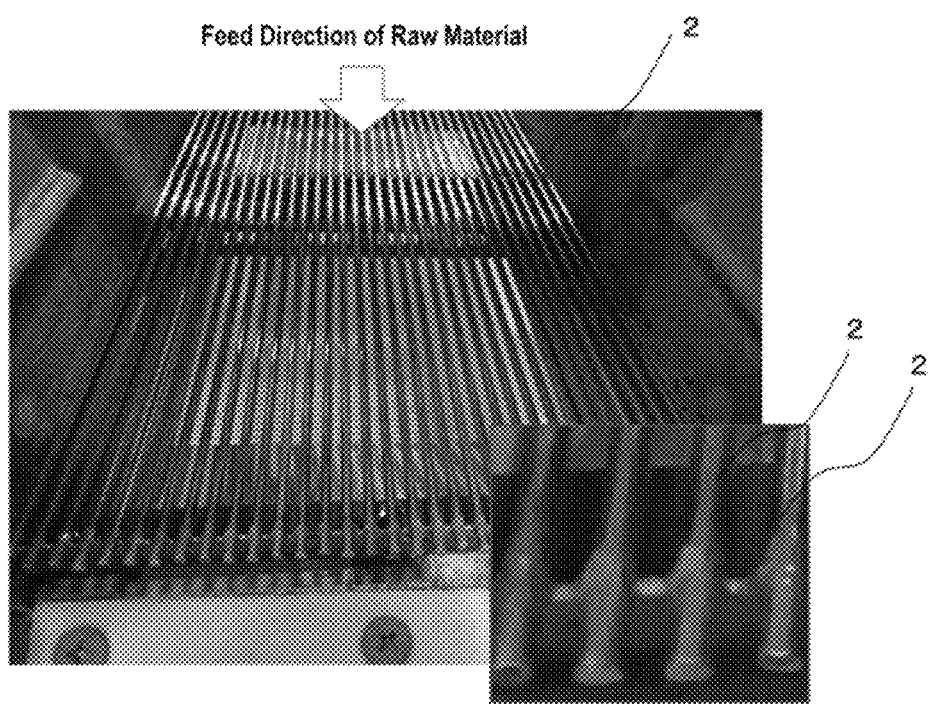
FIG. 2 is a schematic view showing a filter according to an embodiment of the present invention.

The vibrating sieve machine 1 may employ a generally available machine, and its detailed structure is not particularly limited. However, when sieving the wire-form objects, the shape of the filter 3 is particularly devised. Specifically, as shown in FIG. 2 or FIG. 3, a filter 3 having a plurality of rods 2 each extending at distances y from each other is arranged in the vibrating sieve machine 1, thereby improving a sieving efficiency of the wire-form scrap.

The plurality of rods 2 extend in a direction substantially parallel to a feed direction of the raw material (see FIGS. 2 and 4), and extend at distances y (see FIG. 3) so as to be parallel to each other. As shown in FIG. 1, the electronic/electrical apparatus component scrap is placed from an upper surface of the filter 3 to an upper surface of a table 4 and subjected to vibration on the filter 3, so that, as shown in FIGS. 5($a$) and 5($b$), noble metal-containing materials comprised of plate-form objects such as a substrates and ICs are sorted on the upper side of the sieve, and the wire scrap including the coated wires are sorted on the under side of the sieve. In order to improve the sorting efficiency, each of the table 4 and the filter 3 may be arranged so as to be inclined with respect to the horizontal plane.

The table 4 is formed of a board having a flat plate shape, which does not substantially have a gap for sieving out the wire scrap, and the raw material is first fed onto the table 4 before being fed to the filter 3. First, by vibrating the raw material fed on the table 4, the raw material can be dispersed on the upper surface of the table 4. Then, by feeding the dispersed raw material from the upper surface of the table to an upper surface of the filter, an efficiency of sorting the wire-form objects and the plate-form objects through the filter 3 can be further increased. Further, once vibration is applied to the raw material on the table 4, it also provides an effect that orientations of the wire-form objects can be aligned. The vibration applied to the table 4 may be substantially the same as the vibration applied to the filter 3.

Figure 3:
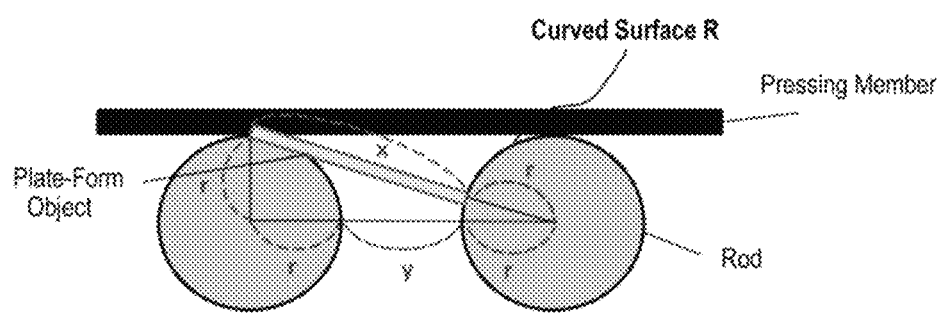
FIG. 3 is a schematic view showing a relationship between distances and radii of a plurality of rods possessed by a filter.
Figure 4:
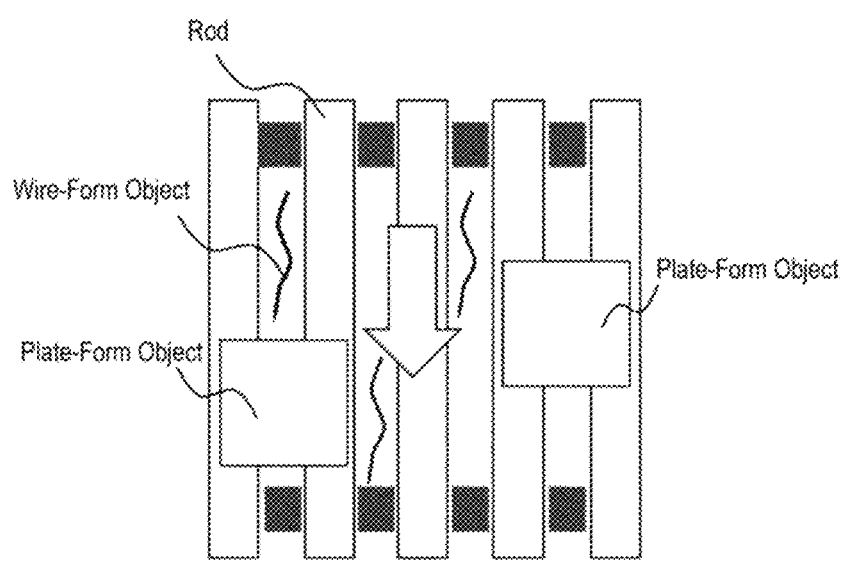
FIG. 4 is a schematic view showing a sorted state as viewed from an upper surface of a filter.

As shown in FIG. 3, a surface of each of the plurality of rods 2 has a curved surface R formed for sieving out the wire scrap under the sieve. Since the wire scrap has a linear shape, if the surface of each of the rods 2 is angular, the wire scrap may be caught by the rods 2 when the wire scrap moves along the feeding direction of the raw material to rise, whereby the wire crap may not be properly separated toward the under side of the sieve.

The curved surface R formed on the surface of each of the plurality of rods 2 can allow smoother contact of the wire scrap with the rods 2, so that the sorting efficiency of the wire scrap can be further improved. In addition, the surface of each of the plurality of rods 2 may be subjected to a surface treatment for allowing smooth contact with the wire scrap.

Here, it is preferable that a distance between the rods 2 and a diameter of each rod 2 are adjusted based on the size of substrates X contained in the electronic/electrical apparatus component scrap. More particularly, for example, as shown in FIG. 3, a distance y between the rods 2 and a radius r of each rod 2 are adjusted so as to have a relationship of $r^2+(y+2r)^2=(x+r)^2$, in which x (mm) is an average size (diameter) of the substrate contained in the electronic/ electrical apparatus component scrap fed on the filter 3, y is a distance between the rods, and r is a radius of each of the rods.

For example, it is preferable that the distance between the plurality of rods is adjusted such that it is 1.2 to 6 times a characteristic particle diameter of the wire-form objects and is narrower than the minimum short dimeter of the plate-form objects. As used herein, the "characteristic particle diameter" of the wire-form objects is determined by extracting arbitrary ten points of the wire-form objects in the raw material, calculating an average diameter of the extracted ten points of the wire-form objects on the long diameter side, repeating them 5 times, and calculate an average value thereof to obtain the "characteristic particle diameter". Similarly, the minimum short diameter of the plate-form objects means an average value obtained by extracting arbitrary ten points of the plate-form objects in the raw material, calculating an average diameter of the extracted ten points of the plate-form objects on the short particle size side, and repeating them 5 times.

More particularly, the rod diameter (2r) can be from 1 mm to 15 mm, for example, although not limited thereto. The distance between the rods can be from 1 mm to 10 mm, and more preferably from 1.5 mm to 5 mm.

In the present embodiment, it is more preferable that the sieving is performed while arranging a pressing member 5 for pressing the raw material on the raw material placed on the filter 3. The pressing member 5 may have such a material and shape that can prevent the plate-form objects contained in the raw material from being rotated due to the vibration applied to the filter 3 and prevent the plate-form objects from falling out from the distances between the rods 2.

Examples of the pressing member 5 that can be used include elastic members such as rubber members, resin members and sponge members, which has elasticity and can maintain the raw material by the elastic force. An elastic vinyl sheet and the like can also be used as the pressing member 5. The use of the elastic member as the pressing member 5 can allow it to move together with the raw material while maintaining a constant distance from the vibrating filter 3, so that unnecessary rotation of the plate-form objects in the raw material can be suppressed. The pressing member 5 may be a member having one or more holes so as to have appropriate frictional force with the raw material.

A plurality of pressing members 5 may be laminated upon the raw material fed onto the filter 3. However, excessive lamination may make it difficult to adjust the load for objects having larger variations in the shapes and sizes of the components contained in the raw material. It is possible to apply the load such that the pressing member 5 is pressed from the upper side of the raw material. However, an excessive load may lead to clogging of the space between the pressing member 5 and the filter 3 with the plate-form objects such as substrates.

The thickness of the pressing member 5 can be selected as needed, depending on the raw material used. When using, for example, the rubber member as the pressing member 5, a sheet-shaped member having a thickness of about 2 mm to 20 mm is preferably arranged so as to cover the raw material. The covering of the raw material with the pressing member 5 can allow an appropriate load to be applied onto the electronic/electrical apparatus components, thereby improving the sorting efficiency. A weight such as an iron plate may be placed on the pressing member 5 to adjust the load.

Figure 5A:
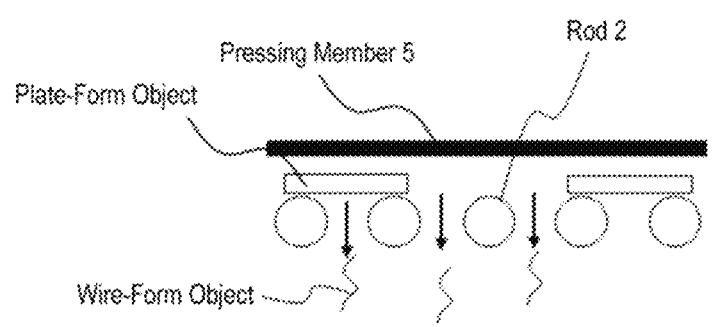
FIG. 5($a$) is a schematic view showing a positional relationship of a pressing member, and a sorted state of plate-form objects and wire-form objects, as viewed from a feed direction of a raw material in a device for removing wire-form objects, and FIG. 5($b$) is a schematic view showing a positional relationship of a pressing member, and a sorted state of plate-form objects and wire-form objects, as viewed from an extending direction of a rod in a device for removing wire-form objects.
Figure 5:
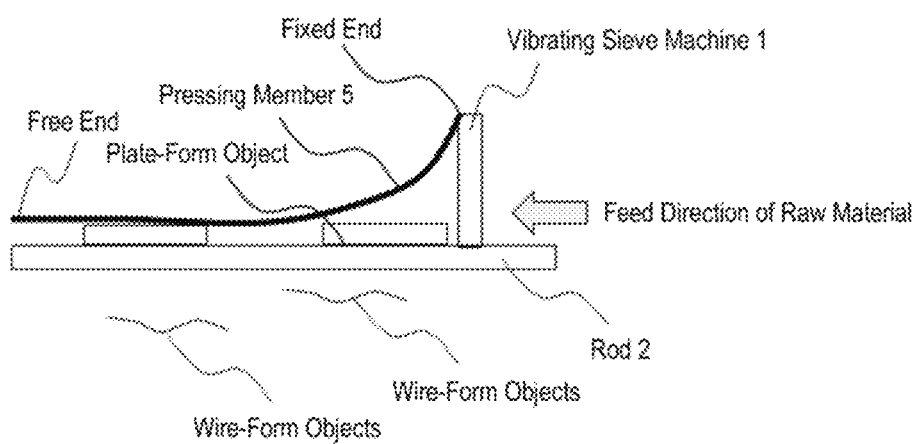

As shown in FIG. 5(b), one end of the pressing member 5 on the feed side of the raw material has a fixed end that is fixed to the vibrating sieve machine 1, and the other end of the pressing member 5 on the discharge side of the raw material has a free end that is not fixed to the vibrating sieve machine 1. The fixed one end of the pressing member 5 can prevent the pressing member from flowing toward the discharge side of the raw material together with the raw material, and the free other end of the pressing member 5 can allow the other end of the pressing member 5 to become easier to move according to the shape and vibration of the raw material, so that the pressing member 5 can facilitate more appropriate pressing of the raw material.

As shown in FIG. 5(b), the fixed end of the pressing member 5 is fixed to an upper portion (upper end) of a feed port of the vibrating sieve machine 1 for feeding the raw material onto the filter 3. Starting from the fixed end, the pressing member 5 is configured to be suspended from the feed side toward the discharge side of the raw material, and the free end of the pressing member 5 is movable in an up-down direction while pressing the raw material on the filter 3 on the discharge side of the raw material. With such a configuration, on the feed side of the raw material, the raw material can be easily vibrated to easily align the orientations of the wire-form objects, and on the discharge side of the raw material, the wire-form objects can be easily sieved toward the under side of the filter 3 by pressing the movement in the up-down direction due to the vibration of the raw material with the pressing member 5.

The pressing member 5 can have a such size that covers the entire surface of the filter 3, and it is arranged. This can allow unnecessary rotation of all of the raw materials on the filter 3 to be pressed with the single pressing member 5, thereby suppressing the falling out of the plate-form objects from the spaces between the rods 2. Alternatively, a plurality of pressing members 5 may be arranged from the feed direction of the raw material to the discharge direction of the raw material.

The sieving of the raw material using the vibrating sieve machine 1 is preferably repeated twice or more. For example, when the electronic/electrical apparatus components are used as the raw material, substrates with components and substrates with no component in the electronic/electrical apparatus components are separated by a first-stage sieving. Then, the second stage sieving can be further carried out for the substrates with no component to transfer approximately 40% of substrates of the entire electronic/electrical apparatus component to the upper side of the sieve.

Further, in addition to the two-step sieving, the load adjustment on the electronic/electrical apparatus components can be carried out with the pressing member 5 to transfer about 70% of substrates contained in the electronic/electrical apparatus components to the upper side of the sieve at the end of the second-stage sieving, and transfer about 90% of the wire scrap (coated wires) to the under side of the sieve.

The vibration is applied to the filter 3 at any magnitude which is not particularly limited as long as the orientations of the wire-form objects can be aligned. The vibration direction is preferably the same as the extending direction of the rod 2, that is, the direction parallel to the feed direction of the raw material (front-back direction). When carrying out continuous processing, the vibration is preferably applied in the up-down direction in addition to the front-back direction. Any amplitude may be employed as long as the raw material moves forward, and can be set as needed depending on to the throughput of the raw material. A device for supplying the vibration applied to the filter 3 may be of a linear type or a rotary type, and is not particularly limited as long as it can generate predetermined vibration.

For example, the vibration can be applied to the upper surface of the filter 3 so that each of a vibration width in a perpendicular direction (a vibration width in the up-down direction) and a vibration width in the front-back direction is from 0.5 to 10 mm. If the vibration width is too high, the separation efficiency of the wire scrap may decrease, and if the vibration width is too low, the effect of vibration cannot be significantly obtained. Therefore, the vibration width may more preferably be from 5 mm to 8 mm. Alternatively, the filter 3 is vibrated at a frequency of about 50 Hz, and the magnitude of the vibration can be adjusted such that transmissibility (excitation ratio) of vibration transmitted from the vibration source to the filter 3 is between 10% to 90%.

The vibration can be intermittently or continuously applied to the filter 3. By continuously applying the vibration, a recovery process of the wire strap can be stably carried out, and by intermittently applying the vibration, the power required for driving the vibration can be omitted.

EXAMPLES

Hereinafter, while examples of the present invention will be described together with comparative examples, these examples are provided for better understanding of the present invention and its advantages, and are not intended to limit the present invention.

An electronic/electrical apparatus component scrap raw material was used as a raw material. The electronic/electrical apparatus component scrap raw material was sorted by wind powder sorting at 15 m/s to provide lightweight materials, which were sieved by a vibrating sieve machine (VSB-312, form KIKOSHA CO., LTD.; a sieve size of W 300×L 1200 mm, processing capacity of 0.2 t/h). As shown in FIG. 1, a table and a filter were arranged in parallel in the vibrating sieve machine for sieving.

As the filter, a copper wire filter having a distance between rods of 1.5 mm and a rod diameter of 8 mm, or a coated wire filter having distances between rods of 4.0, 5.0, and 6.0 mm and a rod diameter of 5 mm was arranged so as to be adjacent to the table. An elastic member (a rubber plate) was placed on the lightweight materials placed on the filter and sieving was carried out.

<Sorted Characteristics of Scrap and Substrate>

The test materials as shown in Table 1 were prepared as component scrap containing wire scrap.

TABLE 1

| Wire Scrap | A | B | C | Average |
|---|---|---|---|---|
| Covered Wire | 57 | 69 | 65 | 64 |
| Copper Wire | 27 | 15 | 29 | 23 |
| Bird's Nest | 16 | 16 | 6 | 13 |
| Total | 100 | 100 | 100 | 100 |

Figure 6:
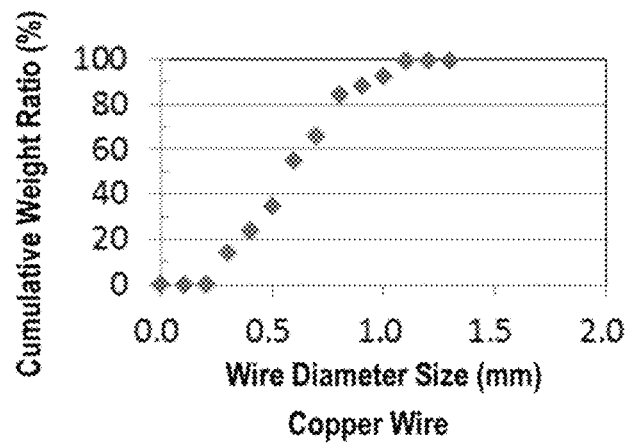
FIG. 6 is graphs each showing results of evaluating a relationship between a wire diameter of wire scrap and a cumulative weight ratio.
Figure 6:
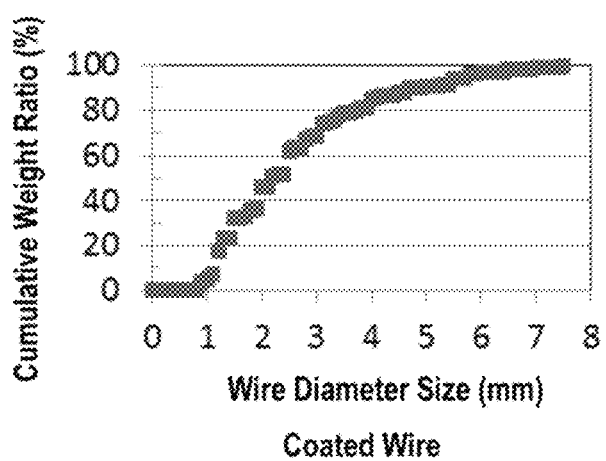

FIG. 6 shows results of evaluating a relationship between a wire diameter and a cumulative weight ratio using the materials A and B. As can be seen from FIG. 6, all of the linear sizes of the copper wires fall within 1.5 mm or less. In other words, it is found that the distance between the rods in the filter of about 1.5 mm can allow the copper wires to be sorted from the component scrap. On the other hand, since 80% or more of the linear sizes of the coated wires was 4.0 mm or less, it was found that the distance between the rods of about 4.0 mm could allow the coated wires to be sorted from the component scrap.

The substrate was modeled as shown in FIG. 3, and a distance y between the rods 2 and a radius r were adjusted so as to have a relationship of $r^2+(y+2r)^2=(x+r)^2$, in which x (mm) was a size (a diameter) of the substrate in the component scrap containing the material A as wire scrap; y was a distance between the rods; and r was a radius of each rod, and evaluation was conducted. As a result, the size of the substrate of 6.7 mm provided the optimum diameter of the rod of 2r=4.8 mm when the distance y between the rods 2 was 4 mm. Based on the results, it was found that the diameter of each rod of about 5 mm was preferable.

<Sorted Characteristic of Scrap and Substrate>

Figure 7:
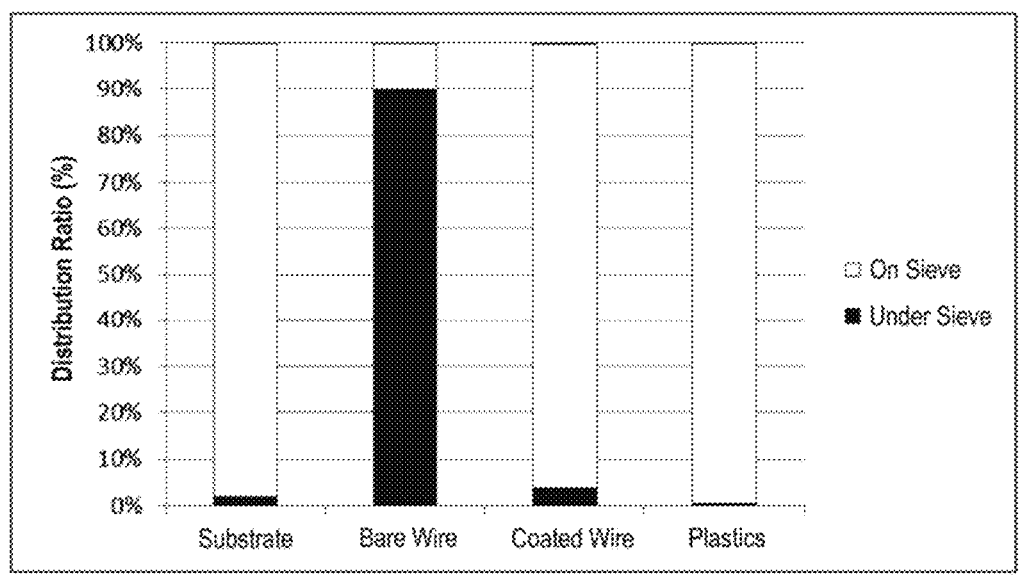
FIG. 7 is a graph showing each distribution ratio when a filter having a rod diameter of 8 mm and a distance between rods of 1.5 mm is placed as a filter to be placed in a vibrating sieve machine, and each component is sieved.

FIG. 7 shows each distribution ratio when a filter having a rod diameter of 8 mm and a distance between rods of 1.5 mm was arranged as a filter to be placed in the vibrating sieve machine, and each component was sieved out. The distribution ratio was evaluated at the time when the materials on the sieve, which had been sieved once, were sieved again, and sieved three times in total, to substantially eliminate the materials under sieve.

As can be seen from FIG. 7, about 90% of the copper wires can be transferred to the under side of the sieve while the substrates remain on the sieve. Substantially all of the powdery materials could be separated together with the copper wires. The separation of the powdery material can expect the effects of preventing erroneous detection of sensors during sorting and of reducing the load of the subsequent process by reducing the volume.

<Separation of Covered Wire>

Figure 8:
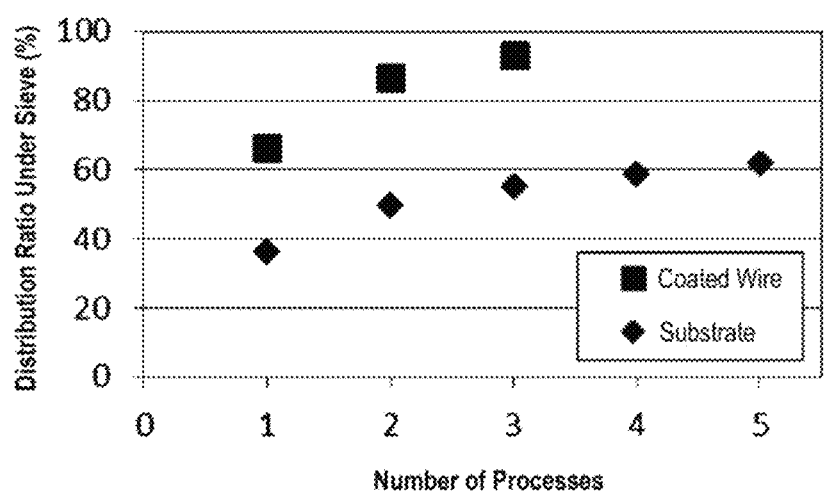
FIG. 8 is a graph showing a distribution ratio under the sieve when a filter having a rod diameter of 5 mm and a distance between rods of 4.0 mm is placed as a filter to be placed in the vibrating sieve machine, and each component is sieved.

FIG. 8 shows a distribution ratio under the sieve when a filter having a rod diameter of 5 mm and a distance between the rods of 4.0 mm was arranged as a filter to be placed in the vibrating sieve machine and each component was sieved. As shown in FIG. 8, 90% or more of the coated wires could be transferred to the under side of the sieve, but about 60% of the substrates were also transferred to the under side of the sieve.

Therefore, the characteristics of the materials on the sieve and the materials under the sieve were evaluated, founding that the materials on the sieve had more substrates with components, and the materials under the sieve had more substrates with no component. This would be because the substrates with no component stood up due to pushing up of the elastic member arranged above the filter by the substrates with components, and dropped down from the spaces between the rods 2. Therefore, the following measures 1 to 4 were taken:

(Measure 1): To press the elastic member from above and fixed during sieving;

(Measure 2): To laminate elastic members (rubber plates) as the pressing member to apply a load;

(Measure 3): To carry out the sieving in two stages (a first stage: separation of the substrates with components from the substrates with no component; a second stage: separation of the substrates with no component from wire scrap); and (Measure 4) To carry out the sieving in two stages and to adjust the load to be applied to the filter by arranging the pressing member.

In the measure 1, the space between the pressing member and the filter might be clogged with the substrates with components. In the measure 2, it was difficult to adjust the load because there were significant variations in the types and sizes of the components attached to the substates. In the measure 3, the substrates with components was sorted from the substrates with no component in the first stage, and the substrates with no component was separated from the wire scrap in the second stage. As a result, about 40% (63%) of the substrates could be transferred to the upper side of the sieve. In the measure 4, about 70% of the substrates could be transferred to the upper side of the sieve and about 90% of the coated wires could be transferred to the under side of the sieve.

The invention claimed is:

1. A method for removing wire-form objects, the method comprising:
arranging a filter in a vibrating sieve machine, the filter comprising a plurality of rods extending at distances in a feed direction of a raw material;
placing a sheet-shaped pressing member comprising a sheet-shaped material having elasticity provided on the filter, the sheet-shaped material extending from a feed side of the raw material to a discharge side of the raw material, the sheet-shaped material suspended from the feed side of the raw material toward the discharge side of the raw material, the sheet-shaped material having a fixed end that is fixed to the vibrating sieve machine on the feed side of the raw material and the sheet-shaped material having a free end that is not fixed to the vibrating sieve machine provided on the discharge side of the raw material, the free end allowing to move according to the shape and vibration of the raw material on the filter, the sheet-shaped material configured to directly contact and press upon the wire-form objects;
placing a raw material containing at least wire-form objects and plate-form objects onto the filter; and
vibrating the filter to sieve out the wire-form objects under the filter while pressing the raw material on the filter from above from between the fixed end and the free end to the free end by the sheet-shaped material.

2. The method for removing the wire-form objects according to claim 1, wherein a surface of each of the plurality of rods that are brought into contact with the raw material comprises a curved surface formed for sieving out the wire-form objects under the filter.

3. The method for removing the wire-form objects according to claim 1, wherein the distances between the plurality of rods and diameters of the plurality of rods are adjusted based on sizes of the plate-form objects contained in the raw material.

4. The method for removing the wire-form objects according to claim 1, wherein the distances between the plurality of rods are adjusted such that each of the distances is 1.2 to 6 times a characteristic particle diameter of the wire-form objects, and is narrower than a minimum short diameter of the plate-form objects.

5. The method for removing the wire-form objects according claim 1,
wherein the vibrating sieve machine comprises a flat plate-shaped table arranged on an upstream side of the filter, and
wherein the method further comprises:
dispersing the raw material on an upper surface of the table by vibrating the raw material fed onto the table; and
feeding the dispersed raw material from the upper surface of the table to an upper surface of the filter.

6. The method for removing the wire-form objects according to claim 1, wherein the raw material is electronic/electrical apparatus component scrap, and wherein the plate-form objects contain substrate scrap, and the wire-form objects contain wire scrap.

7. A method for processing electronic/electric apparatus component scrap, the method comprising:
arranging a filter in a vibrating sieve machine, the filter comprising a plurality of rods extending at distances in a feed direction of a raw material;
placing a sheet-shaped pressing member comprising a sheet-shaped material having elasticity provided on the filter, the sheet-shaped material extending from a feed side of the raw material to a discharge side of the raw material, the sheet-shaped material suspended from the feed side of the raw material toward the discharge side of the raw material, the sheet-shaped material having a fixed end that is fixed to the vibrating sieve machine on the feed side of the raw material and the sheet-shaped material having a free end that is not fixed to the vibrating sieve machine on the discharge side, the free end allowing to move according to the shape and vibration of the raw material on the filter, the sheet-shaped material configured to directly contact and press upon the wire-form objects;
placing a raw material containing at least wire-form objects and plate-form objects onto the filter; and
vibrating the filter to sieve out the wire-form objects under the filter while pressing the raw material on the filter from above from between the fixed end and the free end to the free end by the sheet-shaped material.

8. The method for processing the electronic/electrical apparatus component scrap according to claim 7, wherein the wire-form scrap contains coated wires.

9. A device for removing wire-form objects, the device comprising:
a vibrating sieve machine;
a filter comprising a plurality of rods extending at distances in a feed direction of a raw material disposed in the vibrating sieve machine;
a vibration applying unit for applying vibration to the filter; and
a sheet-shaped pressing member comprising a sheet-shaped material having elasticity provided on the filter, the sheet-shaped material extending from a feed side of the raw material to a discharge side of the raw material, the sheet-shaped material suspended from a feed side of the raw material toward a discharge side of the raw material, the sheet-shaped material having a fixed end that is fixed to the vibrating sieve machine on the feed side of the raw material and the sheet-shaped material having a free end that is not fixed to the vibrating sieve machine on the discharge side, the free end allowing to move according to the shape and vibration of the raw material on the filter, the sheet-shaped material configured to directly contact and press upon the wire-form objects,
wherein a raw material which comprises at least wire-form objects and plate-form objects is placed onto the filter, and the filter is vibrated to sieve out the wire-form objects under the filter while the raw material is pressed on the filter from between the fixed end and the free end to the free end by the pressing member.

10. The device for removing the wire-form objects according to claim 9, wherein the fixed end is fixed to an upper portion of a feed port for feeding the raw material to an upper surface of the filter, and the pressing member is suspended from the feed side toward the discharge side of the raw material with the fixed end as a starting point, and wherein the free end of the pressing member is movable in an up-down direction while pressing the raw material against the upper surface of the filter on the discharge side of the raw material.

11. The device for removing the wire-form objects according to claim 9, wherein the vibrating sieve machine comprises a flat plate-shaped table arranged on an upstream side of the filter, and wherein the raw material fed onto an upper surface of the table is vibrated to disperse the raw material on the upper surface of the table, and the dispersed raw material is fed from the upper surface of the table to the upper surface of the filter.

12. The device for removing the wire-form objects according to claim 9, wherein the raw material is electronic/electrical apparatus component scrap, and wherein the plate-form objects contain substrate scrap, and the wire-form objects contain wire scrap.

13. The method for removing the wire-form objects according to claim 1, wherein the pressing member has a size that can cover an entire surface of the filter.

14. The method for removing the wire-form objects according to claim 1, wherein the pressing member is made from a rubber, a resin, a sponge, or a vinyl sheet and has a thickness of about 2 mm to 20 mm to cover the raw material provided on the filter.

15. The method for removing the wire-form objects according to claim 1, wherein the pressing member presses the raw material by its own weight.

\* \* \* \* \*